United States Patent Office 2,950,632
Patented Aug. 30, 1960

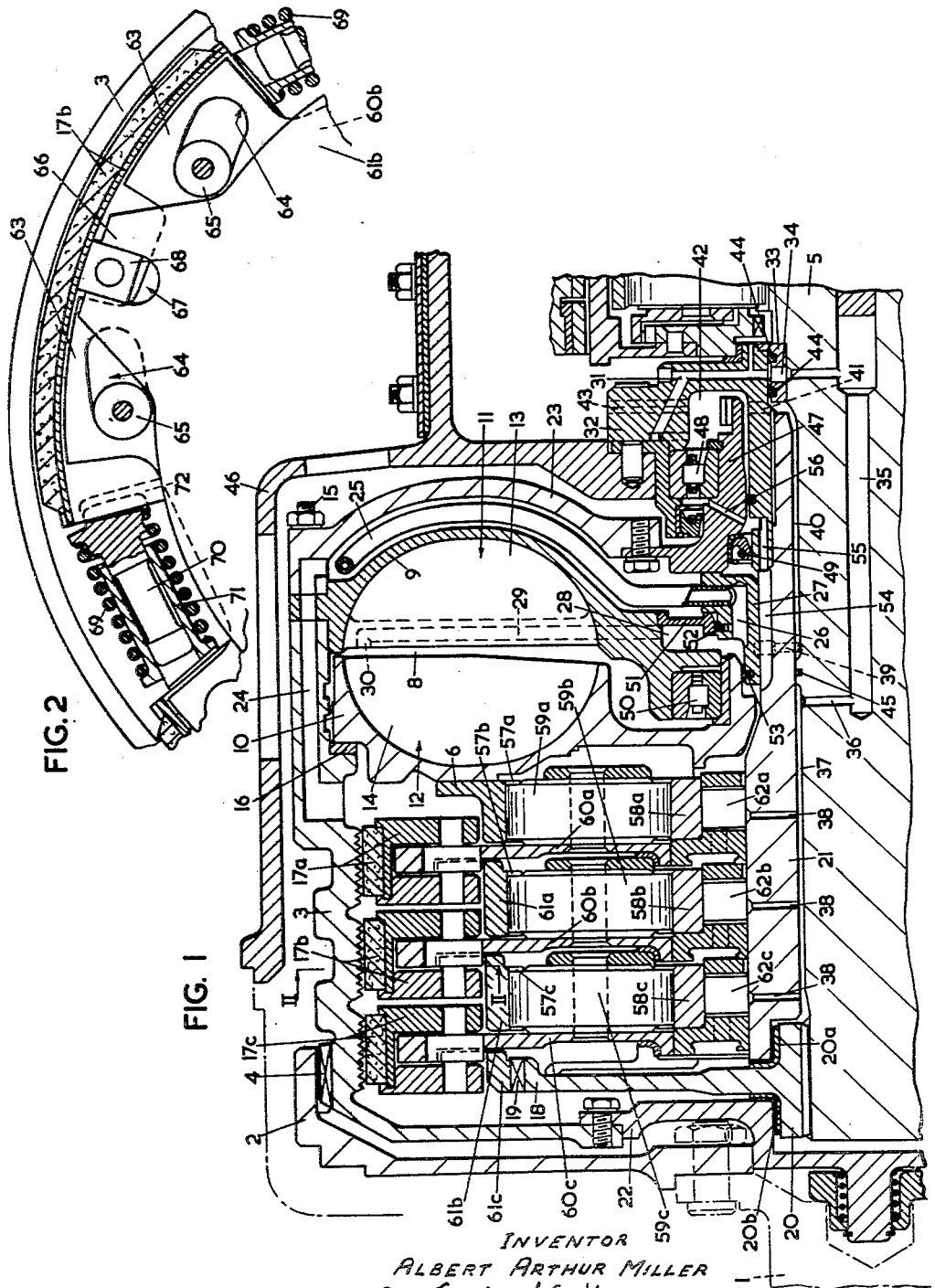

2,950,632

AUTOMATIC CHANGE SPEED GEARS

Albert A. Miller, Esher, England, assignor to Self-Changing Gears Limited, Coventry, England, a British company Filed Oct. 15, 1953, Ser. No. 386,351

Claims priority, application Great Britain Oct. 24, 1952

10 Claims. (Cl. 74—720)

This invention relates to automatic change speed gears, that is to say gears (usually employed in motor vehicles) in which the gear changes are made automatically as necessitated by the conditions.

The object of the invention is the provision of improvements in such automatic change speed gears. The invention consists broadly of an automatic change speed gear drive, wherein, according to whether the automatic change speed gearing proper is at a lower gear or at a higher gear, a hydraulic coupling of the hydro kinetic type is connected in series with said change speed gearing proper or is bypassed and cut out of the transmission.

In order that the invention may be the more clearly understood, an automatic change speed gear in accordance therewith will now be described, reference being made to the accompanying drawings, wherein Figure 1 is a half sectional elevation of the gear, and Figure 2 is a section on line 11—11 of Figure 1.

Referring to the figures, the construction is substantially the same as that described with reference to Figures 7 and 8 of my prior copending United States patent application Ser. No. 357,550 filed May 26, 1952, except that the centrifugal clutch between the engine fly-wheel and the common drum is dispensed with, said common drum being secured or drivingly coupled direct to said engine fly-wheel, and that a hydraulic coupling is connected in the transmission train between said common drum and the three automatic change speed units.

Thus the reference 1 designates the engine shaft and the reference 2 the engine flywheel. The reference 3 designates the common drum, and it will be seen that the flywheel 2 is directly connected to said common drum by means of a tooth coupling 4. The reference 5 designates the output shaft, and between said common drum and said output shaft are connected, in series, three automatic change speed units within said drum. These three units are substantially the same as in the aforesaid Figures 7 and 8 of said prior application Ser. No. 357,550, and it may be stated at the present stage that the reference 6 designates an annulus which constitutes the input to the first unit of the series, and that the reference 61c designates the output plate of the last unit of the series and is connected to said output shaft 5. Said annulus 6, however, is not connected, direct to the common drum 3, but the connection of said annulus 6 to said common drum is through the medium of a hydraulic coupling 8. Thus, in the present arrangement, the transmission train may be traced from the engine shaft 1 and engine flywheel 2 to the common drum 3, and thence through the hydraulic coupling 8 to the annulus 6. From said annulus 6 the transmission train passes through the three change speed units to the output plate 61c and thence to the output shaft 5.

The three units, each of which gives a step down speed transmission, have respective friction shoes 17a, 17b, 17c, which frictionally engage and disengage the drum according to driving conditions, any friction shoe when engaging the drum, by-passing the step down transmission of that unit and establishing direct drive from the drum to the next unit in the series, or, in the case of the last unit, to the output shaft 5. All this is as described in the prior specification aforesaid, and will be described in more detail hereinafter.

Said hydraulic coupling 8 comprises two coaxial elements 9 and 10 which rotate close together. Near their outer perimeters each element is formed with an annular recess or cavity coaxial with the common axis of rotation, and the two annular cavities 11 and 12 face each other close together with the plane of division between them at right angles to the common axis of rotation so that they together form what is virtually an annular enclosure. The annular cavities 11 and 12 may both be of approximately semi-circular cross section as shown so that the resulting annular enclosure is of approximately circular cross section. Each annular cavity 11, 12 is divided into sections by means of a plurality of radial vanes or partitions 13, 14 within it.

The element 9 is the driving element and the element 10 the driven element. Oil is contained in said annular enclosure 11, 12 and means are provided, as will be hereinafter described, whereby, as the driving element rotates, oil is driven into the annular enclosure 11, 12 to make up for any leakage which may have taken place. Centrifugal force maintains the oil in said annular enclosure, and the action of the two sets of vanes 13, 14 on the body of oil in said enclosure sets up a torque between the two elements 9 and 10 which causes the driven element 10 to rotate with the driving element 9. When the engine is accelerated said driven element 10 picks up speed gradually until it rotates at nearly the same speed as the driving element 9, i.e. with only a small amount of fluid slip.

In the present arrangement the driving element 9 is bolted direct to the common drum 3 and the driven element 10 is bolted direct to the said annulus 6. Thus the common drum 3 extends a little further to the right than in the case of the construction of said prior application Ser. No. 357,550, and the driving element is bolted by means of bolts 15 at its outer perimeter within the right hand extremity of said drum. The driven element 10 is enclosed by the common drum 3 and is just to the left of the driving element and is bolted at its left hand face to the said annulus 6.

The mounting of the rotatable unit consisting of the driven element 10 and the said annulus 6 is such that said unit is capable of small axial movement relative to the common drum 3 and driving element 9. The marginal portion of the left hand face of said driven element 10 immediately adjacent to the outer perimeter of said driven element faces directly to the left, and the inner periphery of the common drum is formed with a corresponding annular shoulder which faces directly to the right. Between said marginal portion and said shoulder is provided a rubbing ring 16 which serves as a seal to retain oil in the annular enclosure and is mounted say on said shoulder of the drum 3. Normally there will be no pressure between said rubbing ring 16 and the left hand face of said driven element 10, but, when the common drum and therefore the driving element 9 is set in rotation and the oil is accordingly forced into the annular enclosure 11, 12 between the two elements, the pressure of the oil due to its rotation will force the driven element 10 to the left relative to the driving element 9, and thus pressure will be set up between the left hand face of the driven element and the rubbing ring 16, thus effecting a seal to the annular enclosure and, due to friction, torque will be transmitted through said rubbing ring direct from said common drum 3 to the driven element 10 and therefore to the annulus 6. In operation, therefore, when the drum 3 reaches a given speed of rotation, a direct drive is obtained from said drum to said annulus 6 which by-passes the hydraulic coupling 8, so that hydraulic slip is entirely eliminated.

It may be mentioned, at this stage, that there is also oil within the drum 3 itself, and this has a centrifugal head which exerts a pressure on the driven element 10 tending to shift it to the right, but, for reasons which will hereinafter appear the centrifugal head of oil within the annular enclosure 11, 12 of the coupling 8 will always be greater than that within the drum 3, so that there is a resultant force pressing the driven element 10 to the left as before stated.

It will now be seen that when the engine is started and speeded up, the driving element 9 of the coupling 8 will also be started and speeded up, and the driven element 10 will slowly and smoothly gather speed owing to the action of the hydraulic coupling 8. At the same time a gradually increasing torque will be transmitted through the rubbing ring 16, and, at a given point depending on both the speed and transmitted torque, a substantially en bloc drive will be obtained from the drum to the first of the three change-speed units independently of the hydraulic coupling 8 as such. Transmission will now be taking place direct from the engine to the annulus 6 and thence through the three units in series to the output shaft 5, each of said units acting at its lower speed ratio.

When falling torque and/or rising speed calls for a higher speed ratio, the friction shoes 17a of the first unit will engage the common drum 3, as described in said prior specification aforesaid and as will be hereinafter described, and the drum will transmit direct to the input of the second unit.

It will be seen that the hydraulic coupling 8 as such and also the clutch constituted by the rubbing ring 16 are now entirely by-passed. From now on the operation is exactly as described in said prior specification aforesaid, both when the speed ratio is being increased up to en bloc drive and when it is being reduced, the only difference being that, at the lowest speed ratio, i.e. when all three units are operating at their lower speed ratios, the transmission always includes the hydraulic coupling 8 as such and/or the clutch constituted by the rubbing ring 16.

The drum 3 forms a hydraulically sealed enclosure. Thus, the connection from the output plate 61c of the third unit to the output shaft 5 is by way of a plate 18 coupled by a toothed coupling 19 to said plate 61c and having a sleeve-like boss 20 surrounding said output shaft 5 and fast therewith. The right hand portion of said boss 20 rotates in sealed relation at 20a in a countersunk cavity in the left hand end of a fixed tubular sleeve 21 (corresponding to the sleeve 24 of said prior specification), while the left hand end wall 22 of the drum 3 rotates in sealed relation at 20b on the left hand portion of said boss 20. The right hand end wall 23 of the drum 3, which, it will be seen, is secured to said drum outside the element 9 by the same bolts 15 which secure said element 9, rotates in sealed relation on said fixed tubular sleeve 21. The small portion of the drum 3 to the right of the driving element 9 is in full communication with the main portion of the drum to the left of the driven element by way of passages 24 in the thickness of the circumferential wall of the drum. When the drum 3 is stationary the oil therein will run down to the bottom thereof and when the drum commences to rotate the oil will be thrown outwards by centrifugal force and will form an annulus around the inner periphery of said drum. A fixed tubular scoop 25 is provided in the narrow space between the driving element 9 and the right hand end wall 23 of the drum. The outer end of this scoop 25 dips into the annulus of rotating oil and its inner end is mounted on, and communicates with a passage 26 within a fixed annular block 27 mounted on the fixed tubular sleeve.

The inner periphery of the driving element 9 surrounds this annular block 27 and a closed annular way 28 is formed around said annular block and between the same and the inner periphery of said driving element. The said passage 26 in said fixed annular block 27 leads to this closed annular way 28.

Two diametrically opposite conduits 29 lead radially outwards from said closed annular way 28, and each of them passes through the wall of the driving element 9 and thence, within the thickness of a respective vane 13 in said driving element 9, to a point near the outer limit of the annular enclosure of the hydraulic coupling. At this point said conduit 29 turns at 30 horizontally to the left and thus opens to the interior of said annular enclosure at the edge of said vane 13. In operation, therefore, when the drum 3 commences rotating and the annulus of oil is accordingly formed around its circumferential wall oil from this annulus passes through the scoop 25 and the passage 26 in the fixed annular block 27 into the said annular way 28.

As the driving element 9 is rotating, the oil in the said annular way 28 is rotated and will flow outwards by centrifugal force through the two diametrically opposite conduits 29 into the annular enclosure 11, 12 of the hydraulic coupling 8. Oil will continue to flow into this annular enclosure to make up for any leakage until it is substantially full up.

It will be seen that, owing to the action of the scoop 25 diminishing the head of oil in the drum 3, the centrifugal head within the annular enclosure 11, 12 of the coupling will be greater than that within the drum, and therefore, as previously described, the driven element 10 is forced to the left and takes up with the rubbing ring 16.

Lubricating oil for the gear units flows from a suitable source such as a sump by means of, say, a gear pump, to a conduit 31 in a fixed annular block 32. Said conduit 31 leads radially inwards to an annular clearance between the inner periphery of said annular block 32 and the outer periphery of an annulus 33 let into the surface of the output shaft 5. A number of conduits 34 pass radially inwards through said annulus 33 and said shaft 5 and join an axial conduit 35 within said shaft. From said conduit 35 a number of radial conduits 36 lead outwardly to an annular space 37 between said shaft 5 and the surrounding fixed tubular sleeve 21. From this annular space 37, radial conduits 38 extend outwards through said sleeve 21 into the interior of the drum 3. These radial conduits 38 are arranged in three sets which register, as shown, with the three change speed units. An overflow is provided back to the sump by way of a path which may be traced from the annular way 28, through radial conduits 39 through the fixed sleeve 21, into a second annular clearance 40 between the output shaft 5 and said sleeve 21, and from thence, round the end of said sleeve 21 to the inner periphery of said annular block 31, and through radial holes 41 in said block to an interior space 42 of said block, and thence through radial holes 43 in said block back to the sump.

A longitudinal slot 54 is provided in the outer periphery of the fixed tubular sleeve 21. At its right hand end this slot 54 communicates through conduits 55 and 56, and through the roller bearing 48, with the space 42, and at its left hand end said slot communicates with the main portion of the drum which contains the change speed gear units. Thus, since the space 42 is at atmospheric pressure, it is ensured that the said main portion of the drum is also at atmospheric pressure. It will be seen that this path from the said main portion of the drum to the space 42 bypasses the hydraulic coupling and is cut off from the annular way 28 by the sealing ring 53.

It will be seen that sealing rings 44 are provided between the annular block 32 and the annulus 33 to prevent leakage of the oil passing from the conduit 31 to the conduits 34. Also a sealing ring 45 is provided to prevent any communication between the two annular clearances 37 and 40.

It will now be seen that, when the gear is running, oil will flow by way of the conduits 31, 34, 35 and 36 to the annular space 37, and, from said annular space, through the conduits 38 into the interior of the drum, and, through the three change speed units to the periphery of the drum. Then, as heretofore described, through the passages 24 the scoop 25, the conduit 26, the way 28 and the conduits 29 into the hydraulic coupling 8. When said hydraulic coupling is full up, there will be an overflow from said way 28, through the conduit 39, the annular space 40, the conduits 41, the space 42 and the conduits 43 back to the sump.

Describing now certain constructional features, the drum 3 is enclosed within a fixed outer casing 46. The fixed annular block 32 is secured fast to this casing, and the fixed sleeve 21 is secured fast to the inner periphery of said annular block. The fixed annular block 27 is mounted fast on said sleeve 21.

The right hand wall 23 of the drum is bolted to an annular piece 47 which projects into the space 42 of the block 32. Roller bearings 48 between said annular piece 47 and the fixed casing 46 affords a bearing for that end of the drum, and a sealing gland 49 between said piece 47 and the outer periphery of the fixed sleeve 21 prevents any leakage from the drum at that end.

It will be seen that the element 10 of the hydraulic coupling 8 rotates in roller bearings 50 relative to the element 9. Said element 9 carries an annular plate 51 whose inner periphery runs in sealed relation with the block 27 by virtue of a sealing ring 52, and an annular extension of the element 10 runs in sealed relation with said block 27 by virtue of the sealing ring 53. Thus the aforesaid annular way 28 is effectively sealed off.

It will be observed that the rubbing ring 16 also affords a liquid seal preventing leakage from the annular enclosure 11, 12 of the hydraulic coupling, and that the effectiveness of said liquid seal becomes greater during running owing to the pressure between the driven element 10 and said rubbing ring.

Describing now, in more detail the operation of the three automatic change speed units the input to the first unit is the annulus 6. Said annulus 6, at its inner periphery, carries rigidly an internally toothed gear 57a. Coaxially within said annulus 6 is a sun gear 58a mounted on the fixed sleeve 21 through the medium of a free wheel device 62a so that said sun gear can rotate forwards and not backwards, and, in mesh with both said sun gear and said internally toothed gear 57a, are say three or more planet gears 59a at equal angular intervals around the axis of said drum. These planet gears 59a are mounted on a rotatable planet carrier or input plate 60a which is coupled through the medium of the aforesaid friction shoes 17a, and an output plate 61a which as will hereinafter appear forms the input to the next unit. The precise correlation of the input plate 60a, the friction shoes 17a and the output plate 61a will be described later. For the moment it is sufficient to say that the friction shoes 17a are biased outwardly to the position at which their friction linings engage the inner periphery of the drum 3, and, in response to torque being developed, through said friction shoes, between said input plate 60a and said output plate 61a said friction shoes are urged inwardly, in opposition to their bias, and out of engagement with said drum. It will be seen that, when the two clutch elements, i.e. the friction shoes 17a and the drum 3, are out of engagement the unit transmits with a step-down speed ratio, the annulus 6 causing the planet gears 59a to roll round the stationary sun gear 58a and thereby rotate the input plate 60a at a speed less than that of said annulus, and said input plate rotating the output plate 61a at the same speed as itself through the friction shoes 17a. If, however, the drum 3 and the friction shoes 17a are in clutching engagement, a direct drive will be obtained from the drum 3 to the friction shoes and from said friction shoes to the output plate 61a. The input plate 60a will idle round en bloc with the drum 3, and the sun gears also rotate en bloc with the input plate, this being permitted by the free wheel device 62a.

The engagement and disengagement of the clutch elements (drum 3 and friction shoes 17a) are controlled according to both speed and torque. That is to say the disengagement is effected when the torque is above a given value which is greater or less according as the speed is greater or less, and the engagement is effected when the torque is below a given value which is greater or less according as the speed is greater or less.

Thus when the unit is at rest and no torque is applied to the annulus 6, the friction shoes 17a will be maintained under their bias in clutching engagement with said drum, and the unit will be in condition for direct drive. When now torque is applied to the annulus 6, assuming that the load on the output plate 61a is appreciable, say by the vehicle in which the unit it employed being on level ground and heavily laden, the torque, before the output plate 61a begins to rotate, will rise to a value, depending on the strength of the outward spring bias on the friction shoes 17a, at which the drum 3 will overrun said friction shoes by slippage. When this happens, torque will be transmitted from the annulus 6 to the output plate 61a by the speed reduction path, i.e. from the annulus 6, to the input plate 60a, and thence through the friction shoes 17a to said output plate 61a. This torque will pull said friction shoes 17a inwards out of engagement with the drum 3, and the unit will be at the condition for speed reduction drive.

Assuming now that the unit is transmitting through the other two units, as will hereinafter appear, under conditions of speed reduction, i.e. with the friction shoes 17a held out of engagement with the drum 3 by the torque on the input plate 60a, said friction shoes will be rotating at the speed of said output plate 61a, and said friction shoes will be urged towards the drum-engaging position by centrifugal force depending on the speed of rotation of said output plate. This force will augment the force exerted by the spring bias. When the torque falls or when the speed increases to a value such that the total engaging force exerted on the friction shoes 17a, by centrifugal force and the spring bias, prevails over the disengaging force exerted by said torque, said friction shoes will engage with the drum 3 and the direct drive will be established. At this stage, as heretofore described, the coupling 8 will be driving en bloc. The direct drive through the first unit will, as heretofore described, completely short circuit said coupling 8. It will be seen that the higher is the speed, the higher will be the torque at which this change to direct drive is effected. It will also be seen that immediately the linings of the friction shoes 17a touch the drum 3, there will be a reduction in the torque transmitted by way of the speed reduction path. This causes a reduction in the force tending to disengage the friction shoes 17a, and thus the friction shoes rapidly acquire the full engaging force necessary for direct transmission of the torque so that there will be no sustained slippage and no force tending to disengage the friction shoes, as there will be no torque transmitted via the speed reduction path through the friction shoes acting as links.

Assuming now that the unit is driving the output plate 61a with a direct drive, there will be a drum-engaging force acting on the friction shoes 17a which is due to the force exerted by the spring bias and a centrifugal force depending, as before, on the speed of rotation of the output plate 61a. There will be no drum-disengaging force acting on the friction shoes. When the torque exceeds a given value, slippage will take place and the drum 3 will overrun the friction shoes 17a. When the consequential and appropriate disparity of input and output speeds ensues, a certain amount of torque will be transmitted through the speed reducing path, i.e. through the input plate 60a and the friction shoes 17a acting as connecting links, and thus a drum-disengaging force will be developed acting on the friction shoes. This will increase the torque transmitted through the speed reducing path, which will again increase the disengaging force, and thus in a very short period the friction shoes 17a will be moved to the fully disengaged position and the condition for speed reduction with torque multiplication will obtain.

As just described, in the case of the first unit the internal teeth 57a are fast with said annulus 6, but in the case of the other two units the internal teeth 57b and 57c are respectively fast on the output plates 61a and 61b of the preceding units. The output 61c of the third unit is fast with the output shaft 5 as heretofore described. The sun gears of the second and third units are like that of the first, mounted on the fixed tubular sleeve 21 through the respective free-wheel devices.

In all other respects the three units are identical. The component parts of the units have been designated by the same references except that the suffix a has been added to the component parts of the second unit, the suffix b to the component parts of the second unit, and the suffix c to the component parts of the third unit.

Assuming that all three units are operating at the lower speed ratio, with the friction shoes disengaged from the common drum, the transmission train may be traced from the annulus 6, and the internal teeth 57a of the first unit to the planet carrier or input plate 60a of said first unit, thence through the friction shoes 17a of said first unit acting as links to the output plate 61a of said first unit and the internal teeth 57b of the second unit, thence to the planet carrier or input plate 60b of said second unit, and through the friction shoes 17b of the second unit acting as links, to the output plate 61b of said second unit and the internal teeth 57c of the third unit, thence to the planet carrier or input plate 60c of said third unit, and through the friction shoes 17c of said third unit acting as links, to the output plate 61c of said third unit and the output shaft 5.

It will be noted that under these conditions the torque transmitted by the friction shoes 17a of the first unit is less than that transmitted by the friction shoes 17b of the second unit which, in turn, is less than that transmitted by the friction shoes 17c of the third unit. Also the speed of rotation of the friction shoes 17a of the first unit is greater than that of the friction shoes 17b of the second unit, which, in turn, is greater than that of the friction shoes 17c of the third unit. Therefore the disengaging force is least in the case of the friction shoes 17a of the first unit and greatest in the case of the friction shoes 17c of the third unit while the engaging force is greatest in the case of the friction shoes 17c of the third unit.

It follows that, when falling torque and/or rising speed calls for a higher speed ratio, the friction shoes 17a of the first unit will be the first to engage the common drum 3. When they do so the drive will pass direct from said common drum of the internal teeth 57b of the second unit and the parts of the first unit will all rotate as a block with the common drum. The speed ratio transmitted by the whole assembly will therefore increase.

In like manner, when further falling torque and/or rising speed calls for a still higher speed ratio, the friction shoes 17b of the second unit will be the next to engage the common drum 3, and when they do so the drive will pass direct from said common drum to the internal teeth 57c of the third unit, and the parts of the second unit as well as the first unit will all rotate as a block with the common drum. The speed ratio transmitted by the whole assembly will increase further. When further falling torque and/or rising speed calls for still higher speed ratio, the friction shoes 17c of the third unit will engage the common drum 3, and the drive will pass direct from said common drum to the output shaft 5 via the output plate 61c of the third unit, the parts of all three units rotating as a block with the common drum.

It will be seen that, when this direct drive is in operation, no torque at all exists between the common drum 3 and the friction shoes 17b and 17a of the second and first units, but only between said common drum and the friction shoes 17c of the third unit. Thus when rising torque and/or falling speed calls for a reduction in the speed ratio, the friction shoes 17c of the third unit will be the first to slip relative to the common drum 3, whereupon said third unit will return rapidly to the lower speed ratio state. Torque will now exist between the common drum 3 and the friction shoes 17b of the second unit so, when a further reduction of speed ratio is required the second unit will return to the lower speed ratio state. Last of all the first unit will return to the lower speed ratio state.

Describing now in further detail the construction of the three automatic change speed units the friction shoes 17a of the first unit are in a plane between the gears 59a of said first unit and those 59b of the second unit. The friction shoes 17b of the second unit are likewise in a plane between the gears 59b of the second unit and those 59c of the third unit, and the friction shoes 17c of the third unit are in a plane just to the left of the gears 59c of said third unit.

The planet carrier or input plate 60a, 60b or 60c of each unit consists of a plate immediately to the left of the gears 59a, 59b or 59c of said unit. This has outwardly projecting portions 63 (Figure 2) at intervals round its edge, and two of said projecting portions 63 extend into a central recess of the friction shoe 17a, 17b or 17c of the unit. Each projecting portion has a slot 64 through it, through which passes a pin or roller 65 mounted on the shoe within said recess. It will be seen that the axes of said pins or rollers 65 are parallel to the axis of the drum 3.

The slot and pin connections 64 and 65 between said planet carrier, say 60b and said shoes, say 17b, permit of a lost motion rotary movement between said planet carrier and said shoes, and the slots 64 are so inclined that, when the planet carrier is at the forward limit of its movement relative to said shoes, as in Figure 2, said shoes are held inwardly against their bias out of engagement with the inner periphery of the drum 3, and, when said planet carrier is at the rearward limit of its movement relative to said shoes, said shoes are permitted to engage the inner periphery of the drum.

The output plate 61a, 61b or 61c of each unit is also formed with a number of radial projections 66 which extend into said recess in the shoes of that unit, one into each shoe. Each of these radial projections 66 has a radial slot 67 in it, in which a driving block 68 secured to the shoes, say 17b (Figure 2), slidably engages. It will thus be seen that the output plate of each unit is constrained to rotate with the shoes of that unit, the slot and driving block connections 67, 68 however permitting the shoes to move radially to their engaged and disengaged positions.

The pin-and-slot connections 65, 64 for each shoe are located near the forward and rear ends thereof as shown in Figure 2, so that each shoe is maintained level as it moves to its disengaged and engaged positions. The slot-and-driving block connection 67, 68 for each shoe is located midway between the ends of the shoe.

It will now be seen that, when the friction shoes 17a, 17b or 17c of any unit are at their disengaged position, the planet carrier 60a, 60b or 60c of said unit will drive the internal teeth 57b or 57c of the succeeding unit (or, in the case of the third unit, the output shaft 5) through the pin and slot connections 65, 64, the shoes themselves and the driving-block-and-slot connections 67, 68.

Also owing to the pin-and-slot connections 65, 64 the shoes will be held at their disengaged positions. When the friction shoes of any unit are at the engaged position the gears of that unit will be out of effective operation, and the drive will be direct from the drum 3 to the internal teeth 57b or 57c of the subsequent unit. Also there will be no inward pull tending to operate the shoes of that unit to the disengaged position.

In practice there are four shoes to each unit and the outward biasing is effected by means of compression springs 69 (Figure 2) between the adjacent ends of the shoes. These springs 69 are mounted on telescopic guides having inner and outer elements 70 and 71, the ends of which are forked and engage recesses 72 in the end faces of the shoes.

Other details are deemed sufficiently clear from the drawing.

What is claimed is:

1. A change speed drive comprising a hydraulic coupling of the hydro-kinetic type having a driving element and a driven element, first and second step-down speed transmission units each having an input and an output, means connecting said driven element to the input of said first transmission unit, means connecting the output of said first transmission unit to the input of said second transmission unit, said driving element being subject to running conditions including an increase in speed and a decrease in transmitted torque, means in response to at least one of said conditions coupling said driving element to the output of said first transmission unit, thereby by-passing said hydraulic coupling and said first transmission unit, and means in response to at least one of said conditions coupling said driving element direct to the output of said second transmission unit, thereby by-passing said hydraulic coupling and both transmission units.

2. A change speed drive comprising a drum adapted to be rotated by a source of power, a hydraulic coupling of the hydro-kinetic type having a driving element and a driven element, said driving element being subjected to running conditions including an increase in speed and a decrease in transmitted torque, said coupling being encased in said drum and said driving element being secured to said drum, first and second step-down speed transmission units encased in said drum and each having an input and an output, means connecting said driven element to the input of said first transmission unit, means connecting the output of said first transmission unit to the input of said second transmission unit, clutch means in response to at least one of said conditions coupling the output of said first transmission unit direct to said drum, thereby by-passing said hydraulic coupling and said first transmission unit, and clutch means in response to at least one of said conditions coupling the output of said second transmission unit direct to said drum, thereby by-passing said hydraulic coupling and both transmission units.

3. A change speed drive comprising a drum adapted to be rotated by a source of power, a hydraulic coupling of the hydro-kinetic type having a driving element and a driven element, said driving element being subjected to running conditions including an increase in speed and a decrease in transmitted torque, said coupling being encased in said drum and said driving element being secured to said drum, a step-down speed transmission unit encased in said drum and having an output and an input, means connecting said driven element to the input of said transmission unit, and clutch means in response to at least one of said conditions coupling the output of said transmission unit direct to said drum, thereby by-passing said hydraulic coupling and said transmission unit.

4. A change speed drive comprising a drum adapted to be rotated by a source of power, a hydraulic coupling of the hydro-kinetic type having a driving element and a driven element, said driving element being subject to running conditions including an increase in speed and a decrease in transmitted torque, said coupling being encased coaxially in said drum with said driving element secured to said drum, said driven element being axially movable relative to said driving elements, annular surfaces fast with said drum and said driven element respectively and adapted to come into frictional engagement with each other upon axial movement of said driven element away from said driving element, a step-down transmission unit encased in said drum and having an input and an output, means connecting said driven element to the input of said transmission unit, means whereby, in response to increase in speed of said hydraulic coupling the consequent increase in hydraulic pressure between said driving and driven elements, causes said driven element to be moved axially relative to said driving element and thereby to bring said annular surfaces into frictional engagement with each other, and clutch means in response to at least one of said conditions coupling the output of said transmission unit direct to said drum.

5. A change speed drive comprising a drum adapted to be rotated by a source of power, a hydraulic coupling of the hydro-kinetic type having a driving element and a driven element, said driving element being subjected to running conditions including an increase in speed and a decrease in transmitted torque, said coupling being encased coaxially in said drum with said driving element secured to said drum, said driven element being axially movable relative to said driving element, annular surfaces fast with said drum and said driven element respectively and adapted to come into frictional engagement with each other upon axial movement of said driven element away from said driving element, a step-down transmission unit encased in said drum and having an input and an output, means connecting said driven element to the input of said transmission unit, means whereby, in response to increase in speed of said hydraulic coupling the consequent increase in hydraulic pressure between said driving and driven elements, causes said driven element to be moved axially relative to said driving element and thereby to bring said annular surfaces into frictional engagement with each other, clutch means in response to at least one of said conditions coupling the output of said transmission unit direct to said drum, a second step-down transmission unit encased in said drum, means connecting the output of the first transmission unit to the input of said second transmission unit, and second clutch means in response to at least one of said conditions coupling the output of said second transmission unit direct to said drum.

6. A change speed gear comprising a drum adapted to be rotated by a source of power, a hydraulic coupling of the hydro-kinetic type having a driving element and a driven element, said driving element being subjected to running conditions including an increase in speed and a decrease in transmitted torque, said driving and driven elements having respective annular cavities facing each other to form an annular coupling space, said coupling being encased coaxially in said drum with said driving element secured to said drum, said driven element being axially movable relative to said driving element, annular surfaces fast with said drum and said driven element respectively and adapted to come into frictional engagement with each other upon axial movement of said driven element away from said driving element, a step-down transmission unit encased in said drum and having an input and an output, means connecting said driven element to the input of said transmission unit, a stationary scoop enclosed in said drum the outer end of said scoop being adapted to dip into an annulus of oil round the inner periphery of the drum when the latter is rotating and to carry oil from said annulus to a chamber radially within the annular coupling space between said driving and driven element, conduits adapted to convey oil from said chamber to said annular coupling space by centrifugal force, whereby, in response to increase in speed of said hydraulic coupling the consequent increase in hydraulic pressure in said annular coupling space causes said driven element to be moved axially away from said driving element and thereby to bring said annular surfaces into frictional engagement with each other, and clutch means in response to at least one of said conditions coupling the output of said transmission unit direct to said drum.

7. A change speed gear comprising a drum adapted to be rotated by a source of power, a hydraulic coupling of the hydro-kinetic type having a driving element and a driven element, said driving element being subjected to running conditions including an increase in speed and a decrease in transmitted torque, said driving and driven elements having respective annular cavities facing each other to form an annular coupling space, said coupling being encased coaxially in said drum with said driving element secured in sealed relation around the inner periphery of said drum, said driven element being axially movable relative to said driving element, annular surfaces on the inner periphery of said drum and the outer periphery of said driven element respectively and adapted to come into frictional engagement with each other upon axial movement of said driven element away from said driving element, a step-down transmission unit encased in said drum and having an input and an output, means connecting said driven element to the input of said transmission unit, a stationary scoop enclosed in said drum the outer end of said scoop being adapted to dip into an annulus of oil round the inner periphery of the drum when the latter is rotating and to convey oil from said annulus to a chamber radially within the annular coupling space between said driving and driven element, conduits adapted to convey oil from said annular chamber to said annular coupling space by centrifugal force, whereby, in response to increase in speed of said hydraulic coupling the consequent increase in hydraulic pressure in said annular coupling space causes said driven element to be moved axially away from said driving element and thereby to bring said annular surfaces into frictional engagement with each other, and form a liquid seal preventing leakage from said annular coupling space, and clutch means in response to at least one of said conditions coupling the output of said transmission unit direct to said drum.

8. A change speed gear as claimed in claim 6, and comprising an oil source outside said drum, means for continuously supplying oil from said source to said drum so as to flow radially outwards and lubricate said step-down transmission unit and form said annulus of oil, and means whereby an overflow of oil from said annular chamber returns to said outside oil source.

9. A change speed drive according to claim 1 wherein the driving element and a driven element of said coupling have a common axis of rotation, said driving element and said driven element each defining annular cavities coaxial with said common axis, said cavities opening toward each other and defining a central enclosure, each of said cavities including a plurality of partitions dividing said enclosure into a plurality of separate sections, said sections being adapted to enclose a quantity of liquid coupling said driving element to said driven element, certain ones of said partitions in said driving element defining conduits for receiving liquid therethrough, and wherein means are associated with said driving element for feeding additional liquid into said enclosure through said conduits by centrifugal force to replenish said enclosure with liquid to compensate for any leakage through said coupling.

10. A change speed drive according to claim 6 and comprising an external source of oil, means for feeding oil from said source into said drum, means for leaking oil from said annular coupling space into said drum, frictional engagement of said annular surfaces cutting off leakage oil from said annular coupling space to said drum, and means for leaking excess oil from said chamber back to said source.

References Cited in the file of this patent

UNITED STATES PATENTS

| | | |
|---|---|---|
| 2,049,673 | Starr | Aug. 4, 1936 |
| 2,126,547 | Fottinger | Aug. 9, 1938 |
| 2,299,049 | Ziebolz | Oct. 13, 1942 |
| 2,344,656 | Swennes | Mar. 21, 1944 |
| 2,374,303 | Osborne | Apr. 24, 1945 |
| 2,467,108 | Barlow | Apr. 12, 1949 |
| 2,536,861 | Weeks et al. | Jan. 2, 1951 |
| 2,592,537 | Burtnett | Apr. 15, 1952 |
| 2,688,886 | Flynn | Sept. 14, 1954 |
| 2,749,775 | Simpson | June 12, 1956 |
| 2,864,266 | Weis | Dec. 16, 1958 |

FOREIGN PATENTS

| | | |
|---|---|---|
| 668,839 | France | Nov. 7, 1929 |
| 611,484 | Germany | Mar. 29, 1935 |
| 677,927 | Germany | July 6, 1939 |